United States Patent
Pellar (10) Patent No.: US 7,450,133 B2
(45) Date of Patent: Nov. 11, 2008

(54) SYSTEM AND METHOD FOR COLOR CORRECTION

(75) Inventor: Ronald J. Pellar, Orange, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 356 days.

(21) Appl. No.: 10/922,622

(22) Filed: Aug. 20, 2004

(65) Prior Publication Data

US 2006/0038824 A1  Feb. 23, 2006

(51) Int. Cl.
G09G 5/02 (2006.01)

(52) U.S. Cl. ...................................... 345/589

(58) Field of Classification Search ........................ None
See application file for complete search history.

(56) References Cited

U.S. PATENT DOCUMENTS

| | | | |
|---|---|---|---|
| 5,060,060 A | 10/1991 | Udagawa et al. | |
| 5,243,414 A | 9/1993 | Dalrymple et al. | |
| 5,268,753 A | 12/1993 | Yamaguchi | |
| 5,315,381 A | 5/1994 | Yamashita et al. | |
| 5,539,540 A | 7/1996 | Spaulding et al. | |
| 5,754,448 A | 5/1998 | Edge et al. | |
| 5,828,816 A | 10/1998 | Kise et al. | |
| 6,157,734 A | 12/2000 | Iida | |
| 2003/0019381 A1 | 1/2003 | Yamamoto | |
| 2003/0072016 A1 | 4/2003 | Dalrymple et al. | |
| 2004/0066387 A1* | 4/2004 | Kumar et al. | 345/604 |
| 2004/0105105 A1* | 6/2004 | Smith | 358/1.9 |

* cited by examiner

*Primary Examiner*—Kee M Tung
*Assistant Examiner*—Aaron M Richer
(74) *Attorney, Agent, or Firm*—Tucker Ellis & West, LLP (57) ABSTRACT

This invention is directed to a system and method for performing color corrections on color image data. More particularly, this invention is directed to a system and method for performing color corrections on color image data in a primary color system. This invention is particularly useful in performing color corrections on color image data that is to be output on a image processing apparatus.

28 Claims, 4 Drawing Sheets

SYSTEM AND METHOD FOR COLOR CORRECTION

BACKGROUND OF THE INVENTION

This invention is directed to a system and method for performing color corrections on color image data. More particularly, this invention is directed to a system and method for performing color corrections on color image data in a primary color system. This invention is particularly useful in performing color corrections on color image data that is to be output on a image processing apparatus.

Device profiles or the like are typically used to translate color data created on one device into another device's native color space. A color space is typically a particular model of colors, represented by a tri-dimensional map. There are three broad classes of devices, input devices, display devices and output devices. For each device class; a series of base algorithmic models are described that perform a transformation between color spaces. The models provide a range of color quality and performance results equating to different tradeoffs in memory footprint, performance and image quality.

A color model that describes each color in terms of the quantity of each secondary color, cyan, magenta, yellow, and black is commonly referred to as the CMYK color model. The CMYK system is used for printing. For mixing of pigments, it is better to use the subtractive colors, since they mix subtractively. In addition, although black could be obtained by mixing these three in equal proportions, in four-color printing, black is typically used as a separate colorant. The K in CMYK stands for 'Key' or 'blacK,' so as not to cause confusion with the B in RGB (Red, Green, Blue) color model.

As will be known in the art, the difference between the two color models is based on how color is produced. Red, green, and blue are projected light and cyan, magenta, yellow, and black is reflected light. Combining varying amounts of red, green and blue will faithfully create the spectrum of colors. By varying the amounts of red, green and blue, an image may be projected onto the phosphors of a monitor or television screen. However, pigments added to paper, successively, will darken the paper. Using selective light colors will recreate the spectrum on white paper. Thus, cyan will absorb red, magenta will absorb green and yellow will absorb blue. These are called the subtractive primary colors, or secondary colors. Because of the lightness of cyan, magenta and yellow, black, is used for the gray components.

Often the color conversion from one color space to a second color space is not flawless and there are errors in the quality, intensity, lightness, or other features of the second color space. For example, the CMYK printing materials for use in an image processing apparatus are not perfectly complementary colors of RGB, and will often generate solid blue colors that contain too much purple color.

The subject invention remedies the aforementioned problems and provides a mechanism which performs color corrections on color image data, especially in a primary color system.

SUMMARY OF THE INVENTION

In accordance with the present invention, there is provided a system and method which performs color corrections on image data.

In accordance with the present invention, there is provided a system and method which performs color corrections on color image data in a primary color system.

Further, in accordance with the present invention, there is provided a system and method for performing color corrections on color image data that is to be output on a image processing apparatus.

Still further, in accordance with the present invention, there is provided a system for color correction. The system comprises means adapted for receiving a first color signal, which first color signal includes primary color data inclusive of data associated with of each of plurality of primary colors and means adapted for generating a threshold signal representative of a testing of a value of data of a selected one of the primary colors against a selected threshold value. The system further comprises means adapted for selectively generating, in accordance with the threshold signal, a color correction signal as a function of the value of data from the selected one of the primary colors and a value of at least a second selected one of the primary colors. The primary colors are suitably the subtractive primary colors of cyan, magenta, and yellow, or the additive primary colors of red, green, and blue.

In a preferred embodiment, the function is chosen such that a magnitude of the color correction signal is dictated by a proximity of value of a designated one of the primary colors relative to values of primary colors adjacent thereto. In one such embodiment, the primary colors are the subtractive primary colors and the means for generating the threshold value includes means adapted for determining whether the value of data representative of the selected one of the primary colors is less than that associated with every other primary color of the plurality thereof.

In another embodiment, the primary colors are the additive primary colors and the means for generating the threshold value includes means adapted for determining whether the value of data representative of the selected one of the primary colors is greater than that associated with every other primary color of the plurality thereof.

Still further in accordance with the present invention, there is provided a system for color correction for use in a subtractive primary color system, including at least first, second and third complementary primary colors. The system comprises means adapted for generating a threshold signal in the event that the first primary color includes an associated value less than a corresponding, associated value of each of the second and third primary colors and means adapted for generating a relation signal representative of whether an associated value of the second primary color is less than an associated value of the third primary color. The system further comprises means adapted for generating, in the presence of the relation signal, modification of the value of the second primary color as a function of the value of the first primary color and the value of the second primary color and means adapted for generating, in the absence of the relation signal, modification of the value of the second primary color as a function of the value of the first primary color and the value of the third primary color. The primary colors are suitably cyan, magenta, and yellow.

Still further in accordance with the present invention, there is provided a system for color correction for use in an additive primary color system, including at least first, second and third complementary primary colors. The system comprises means adapted for generating a threshold signal in the event that the first primary color includes an associated value greater than a corresponding, associated value of each of the second and third primary colors and means adapted for generating a relation signal representative of whether an associated value of the second primary color is greater than an associated value of the third primary color. The system further comprises means adapted for generating, in the presence of the relation signal, modification of the value of the second primary color as a function of the value of the first primary color and the value of the second primary color and means adapted for generating, in the absence of the relation signal, modification of the value of the second primary color as a function of the value of the first primary color and the value of the third primary color. The primary colors are suitably red, green, and blue.

Still further, in accordance with the present invention, there is provided a method for color correction. The method comprises the steps of receiving a first color signal, which first color signal includes primary color data inclusive of data associated with of each of plurality of primary colors and generating a threshold signal representative of a testing of a value of data of a selected one of the primary colors against a selected threshold value. The method further comprises the step of selectively generating, in accordance with the threshold signal, a color correction signal as a function of the value of data from the selected one of the primary colors and a value of at least a second selected one of the primary colors. The primary colors are suitably the subtractive primary colors of cyan, magenta, and yellow, or the additive primary colors of red, green, and blue.

In a preferred embodiment, the function is chosen such that a magnitude of the color correction signal is dictated by a proximity of value of a designated one of the primary colors relative to values of primary colors adjacent thereto. In one such embodiment, the primary colors are the subtractive primary colors and the step of generating the threshold value includes determining whether the value of data representative of the selected one of the primary colors is less than that associated with every other primary color of the plurality thereof.

In another embodiment, the primary colors are the additive primary colors and the step of generating the threshold value includes determining whether the value of data representative of the selected one of the primary colors is greater than that associated with every other primary color of the plurality thereof.

Still further in accordance with the present invention, there is provided a method for color correction for use in a subtractive primary color system, including at least first, second and third complementary primary colors. The method comprises the steps of generating a threshold signal in the event that the first primary color includes an associated value less than a corresponding, associated value of each of the second and third primary colors and generating a relation signal representative of whether an associated value of the second primary color is less than an associated value of the third primary color. The method further comprises the steps of generating, in the presence of the relation signal, modification of the value of the second primary color as a function of the value of the first primary color and the value of the second primary color and generating, in the absence of the relation signal, modification of the value of the second primary color as a function of the value of the first primary color and the value of the third primary color. The primary colors are suitably cyan, magenta, and yellow.

Still further in accordance with the present invention, there is provided a method for color correction for use in an additive primary color system, including at least first, second and third complementary primary colors. The method comprises the steps of generating a threshold signal in the event that the first primary color includes an associated value greater than a corresponding, associated value of each of the second and third primary colors and generating a relation signal representative of whether an associated value of the second primary color is greater than an associated value of the third primary color. The method further comprises the steps of generating, in the presence of the relation signal, modification of the value of the second primary color as a function of the value of the first primary color and the value of the second primary color and generating, in the absence of the relation signal, modification of the value of the second primary color as a function of the value of the first primary color and the value of the third primary color. The primary colors are suitably red, blue, and green.

These and other aspects, advantages, and features of the present invention will be understood by one of ordinary skill in the art upon reading and understanding the specification.

BRIEF DESCRIPTION OF THE DRAWINGS

The subject invention is described with reference to certain parts, and arrangements to parts, which are evidenced in conjunction with the associated drawings, which form a part hereof and not, for the purposes of limiting the same in which.

DETAILED DESCRIPTION OF THE PREFERRED EMBODIMENT

The present invention is directed to a system and method for performing color corrections on color image data. More particularly, this invention is directed to a system and method for performing color corrections on color image data in a primary color system. This invention is particularly useful for correcting color in color image data that is to be output on an image processing apparatus.

Figure 1:
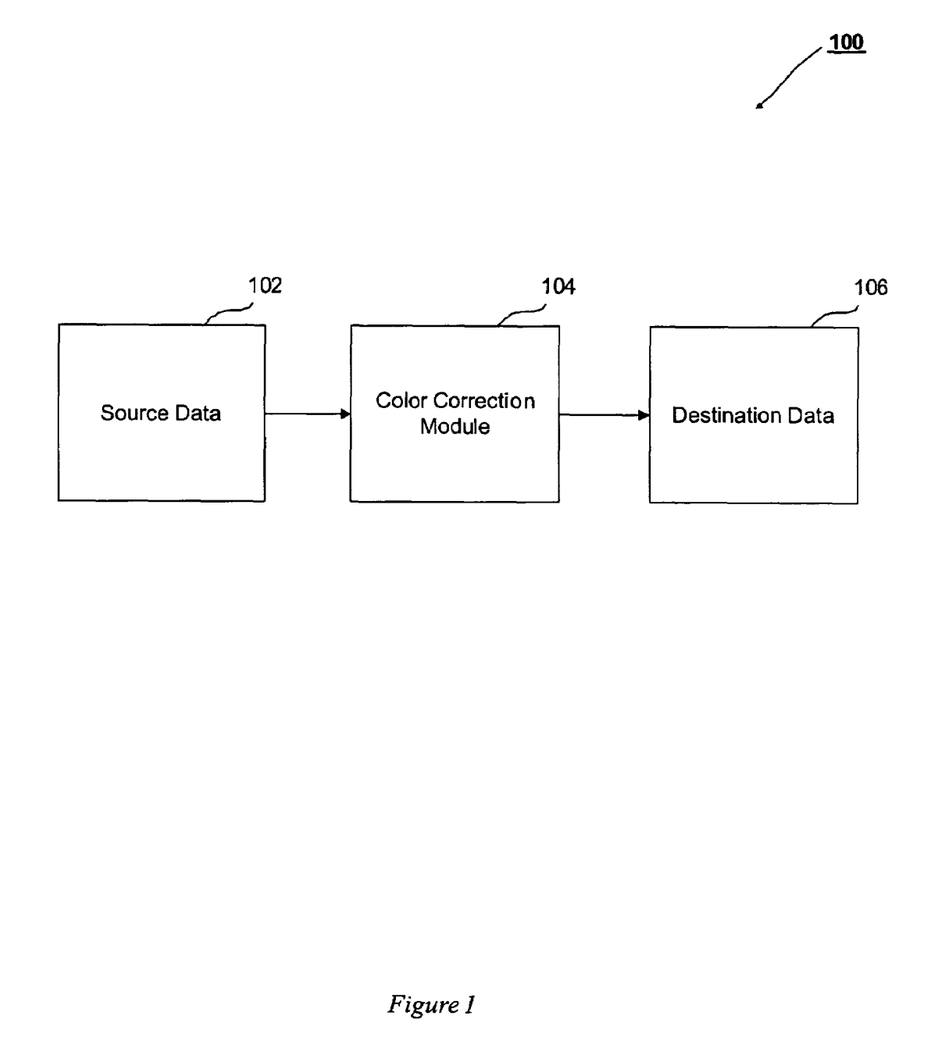
FIG. 1 is a block diagram illustrative of the system of the present invention.

FIG. 1 shows a block diagram preferred embodiment of the system according to the present invention generally designated as 100. As shown, the system 100 comprises source data 102 in the form of scanner or camera input, monitor RGB input, CMYK device input, or the like. Also included in the system is destination data 106, preferably in the CMYK form that a printer or other output device may use. The system also includes a color correction module 104 for performing color corrections on the source data to generate the destination data.

Figure 2:
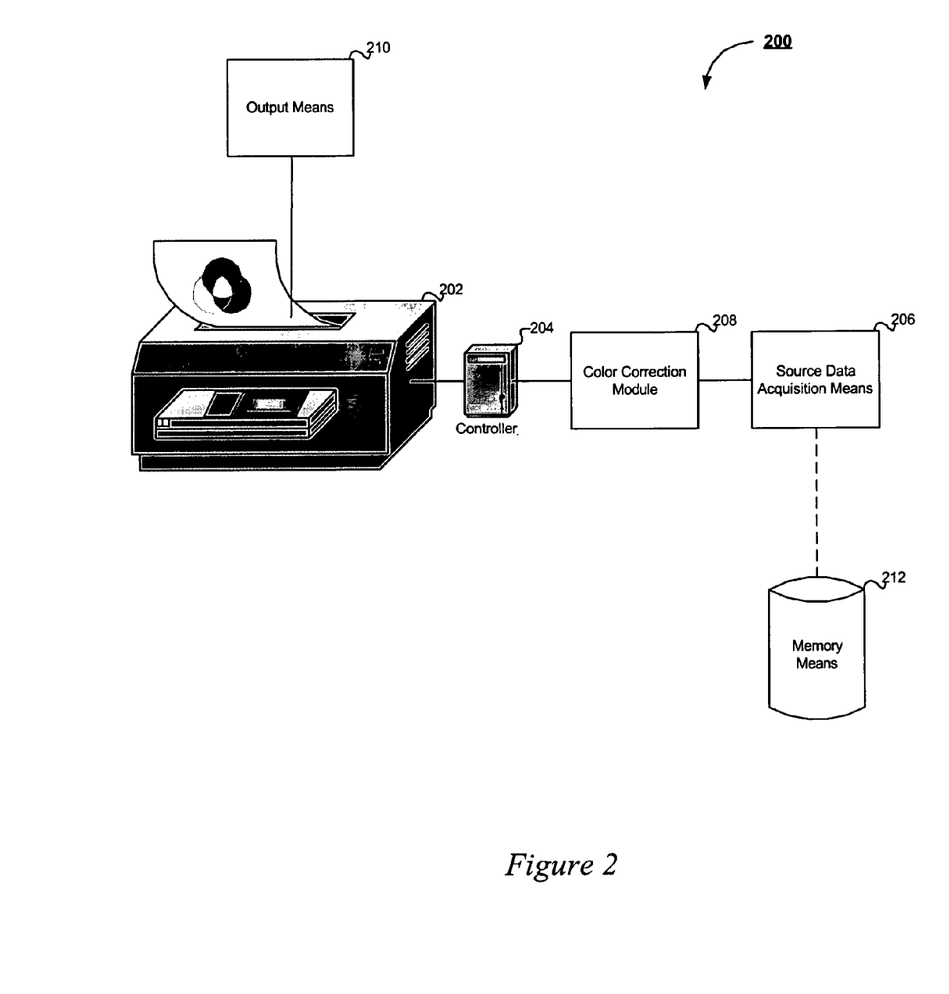
FIG. 2 is a block diagram illustrative of a preferred system of the present invention.

In a preferred embodiment, as shown in FIG. 2, the system 200 comprises at least one image processing peripheral, as illustrated by multi-function peripheral device 202, for generating or processing image data. It is to be appreciated that image processing peripheral is any suitable image processing device known in the art, such as a copier, printer, scanner, facsimile and the like, or any combination thereof. Suitable commercially available image processing peripherals include, but are not limited to, the Toshiba e-Studio Series Controller. The image processing peripheral further comprises a controller 204 which controls the functions of the image processing peripheral as will be appreciated by one of ordinary skill in the art.

The image processing peripheral includes means for acquiring source data 206. Such means are any suitable means known in the art. Such means include, but are not limited to, receiving the image data from workstation in data communication with the image processing peripheral, scanning the image data at the image processing peripheral, and the like. The image processing device includes a color correction module 208 which performs color corrections on the source data. It is understood that the color correction module is also suitably in data communication with the image processing peripheral and receives the source data via any suitable means for performing color corrections thereon. The color correction module performs color corrections on the source data to generate destination data which is output from the image processing peripheral via output means 210. The output means are any suitable output means known in the art.

Figure 3:
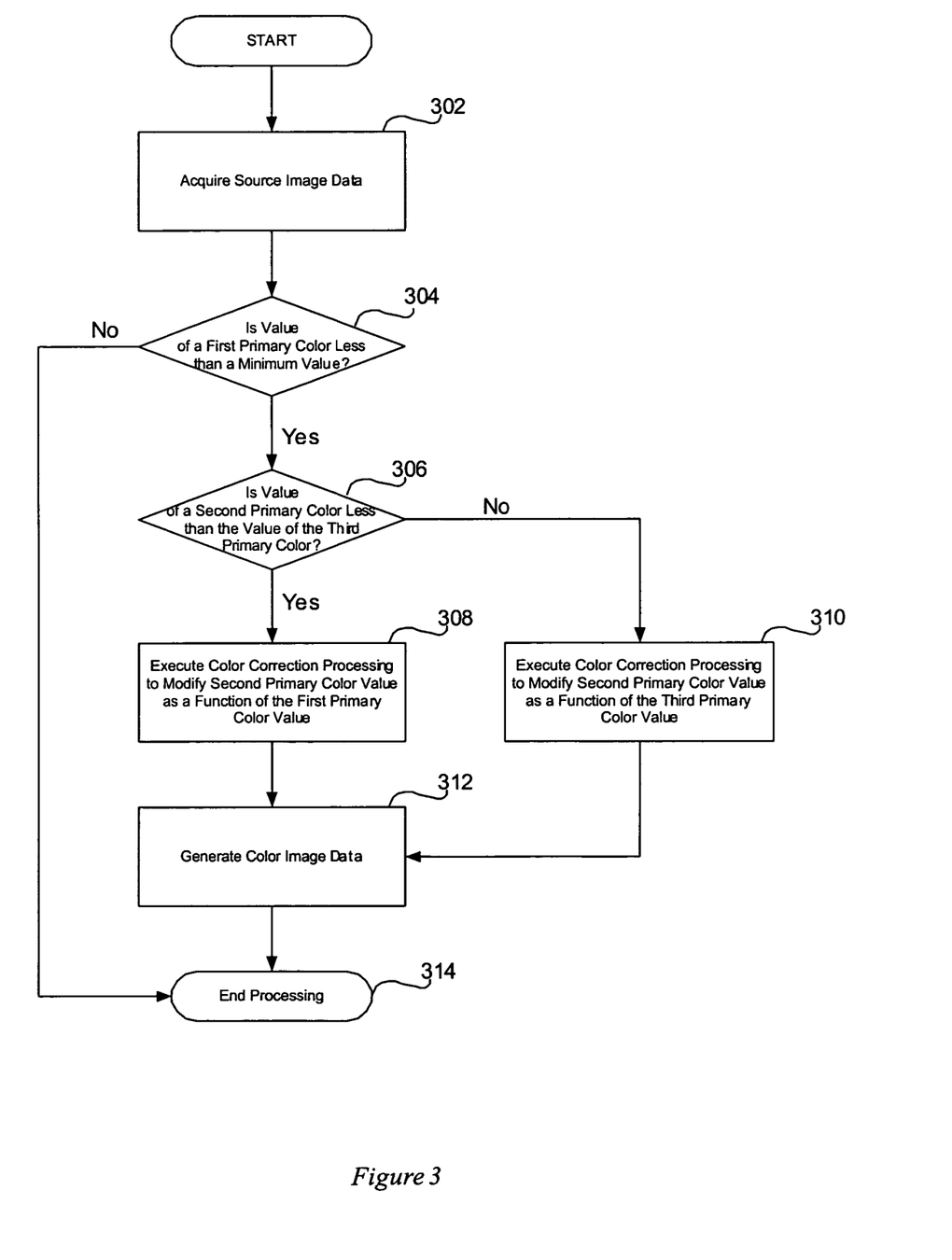
FIG. 3 is a flow chart illustrating one embodiment of the operation of the present invention.
Figure 4:
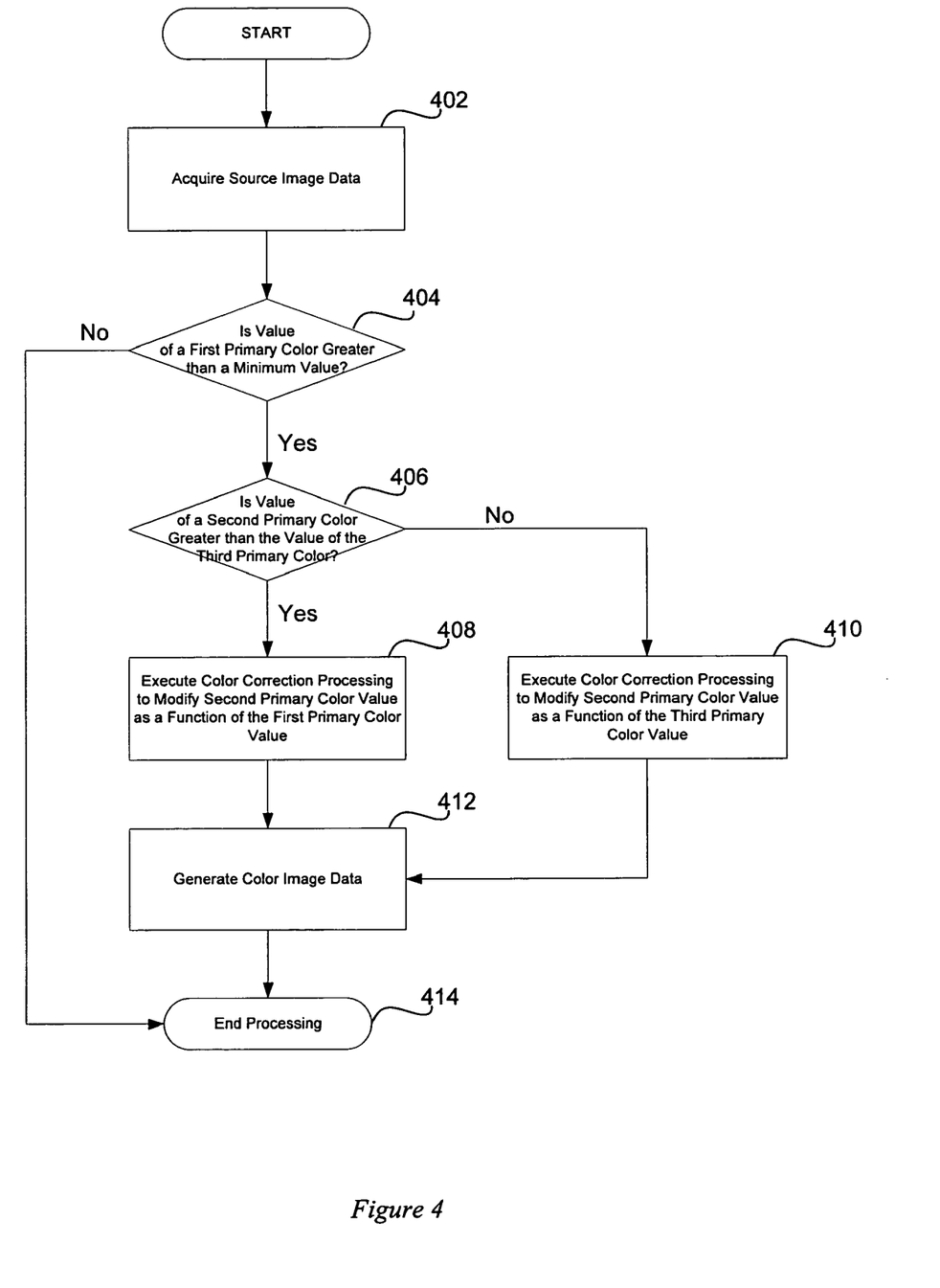
FIG. 4 is a flow chart illustrating another embodiment of the operation of the present invention.

The system 200 of FIG. 2 will be more clearly understood by the method of the invention as shown in FIGS. 3 and 4. FIG. 3 illustrates the method as used with the subtractive primary colors. At 302, the system acquires source color image data by any suitable means. The source color image data includes primary color data inclusive of a plurality of primary colors. In a preferred embodiment, the source color image data includes subtractive primary color data inclusive of three complementary primary colors.

At 304, the value of one of the primary colors is tested via any suitable means at the color correction module to determine if such value is at or below a selected threshold value, such as a minimum value. In a preferred embodiment, the value of one of the primary colors is tested to determine if such value is less than the value of the other primary colors. For example, in one embodiment, the value of the yellow component is tested against the values of the cyan and magenta components to determine if the yellow components is less than the cyan and magenta components. It is understood however, that the value of the cyan component or the value of the magenta component are suitably also tested to determine if such component is less than the values of the other two components or a selected threshold value for other color correction processes.

If the value of the selected primary color component is not at or below the selected threshold value or less than the values of the other two components, the process terminates at 314 and no color correction is performed.

If the value of the selected primary color component is at or below the selected threshold value or less than the values of the other two primary color components, the process flows to 306 wherein the value of a second primary color is tested via any suitable means against the value of a third primary color. In one embodiment, the value of the magenta component is tested against the value of the cyan component to determine if the value of the magenta component is less than the value of the cyan component. It is understood that if the value of the magenta component or the cyan component are tested in step 304, rather than the value of the yellow component, then the value of the yellow component is tested against the value of the magenta or cyan component not tested in step 304.

If the value of the second primary color is less than the value of the third primary color, flow proceeds to step 308 for color correction processing in accordance with the result of such testing. If the value of second primary color component is less than the value of the third primary color component, then the value of the second primary color component is modified such that the new value is a function of the value of the first primary color component and the value of the second primary color component. The function is any suitable function known in the art for adjusting color component values. The function is suitably a calculated function for adjusting the value or a function value retrieved from a memory means, such as a look up table. Preferably, the function is chosen such that a magnitude of the color correction signal is dictated by a proximity of value of a designated one of the primary colors relative to values of primary colors adjacent thereto. In a preferred embodiment, the value of the second primary color component is modified such that the new value equals the current value of the second primary color component less a function of the value of the first primary color component and the value of the second primary color component. Flow then proceeds to 312, wherein the color image data is generated in accordance with the color correction process.

In one embodiment, if the value of the magenta component is determined to be less than the value of the cyan component, the color correction process is in accordance with such result. The value of the magenta component is modified as a function of the value of the yellow component and the magenta component. Preferably, the value of the magenta component is modified such that the new value equals the current value of the magenta component minus a function of the value of the yellow component and the value of the magenta component. It is understood that if the value of the magenta component is tested in step 304, rather than the value of the yellow component, than the either the value of the yellow component or the value of the cyan component are used as the second component, and the value of the second component is modified as described. Further, if the value of the cyan component is tested in step 304, then either the value of the yellow component or the value of the magenta component are used as the second component, and the value of the second component is modified as described.

If the value of the second primary color is not less than the value of the third primary color, flow proceeds to step 310 for color correction processing in accordance with the result of such testing. If the value of second primary color component is not less than the value of the third primary color component, then the value of the second primary color component is modified such that the new value is a function of the value of the first primary color component and the value of the third primary color component. The function is any suitable function known in the art for adjusting color component values. The function is suitably a calculated function for adjusting the value or a function value retrieved from a memory means, such as a look up table. Preferably, the function is chosen such that a magnitude of the color correction signal is dictated by a proximity of value of a designated one of the primary colors relative to values of primary colors adjacent thereto. In a preferred embodiment, the value of the second primary color component is modified such that the new value equals the current value of the second primary color component less a function of the value of the first primary color component and the value of the third primary color component. Flow then proceeds to 312, wherein the color image data is generated in accordance with the color correction process.

In one embodiment, if the value of the magenta component is determined not to be less than the value of the cyan component, the color correction process is in accordance with such result. The value of the magenta component is modified as a function of the value of the yellow component and the cyan component. Preferably, the value of the magenta component is modified such that the new value equals the current value of the magenta component minus a function of the value of the yellow component and the value of the cyan component. It is understood that if the value of the magenta component is tested in step 304, rather than the value of the yellow component, than the either the value of the yellow component or the value of the cyan component are used as the second component, and the value of the second component is modified as described. Further, if the value of the cyan component is tested in step 304, then either the value of the yellow component or the value of the magenta component are used as the second component, and the value of the second component is modified as described.

FIG. 4 illustrates the method as used with the additive primary colors. At 402, the system acquires source color image data by any suitable means. The source color image data includes primary color data inclusive of a plurality of primary colors. In a preferred embodiment, the source color image data includes additive primary color data inclusive of three complementary primary colors.

At 404, the value of one of the primary colors is tested via any suitable means at the color correction module to determine if such value is at or above a selected threshold value, such as a maximum value. In a preferred embodiment, the value of one of the primary colors is tested to determine if such value is greater than the value of the other primary colors. For example, in one embodiment, the value of the blue component is tested against the values of the red and green components to determine if the blue components is greater than the red and green components. It is understood however, that the value of the red component or the value of the green component are suitably also tested to determine if such component is greater than the values of the other two components or a selected threshold value for other color correction processes.

If the value of the selected primary color component is not at or above the selected threshold value or more than the values of the other two components, the process terminates at 414 and no color correction is performed.

If the value of the selected primary color component is at or above the selected threshold value or greater than the values of the other two primary color components, the process flows to 406 wherein the value of a second primary color is tested via any suitable means against the value of a third primary color. In a preferred embodiment, the value of the green component is tested against the value of the red component to determine if the value of the green component is greater than the value of the red component. It is understood that if the value of the green component or the red component are tested in step 404, rather than the value of the blue component, then the value of the blue component is tested against the value of the green or red component not tested in step 404.

If the value of the second primary color is greater than the value of the third primary color, flow proceeds to step 408 for color correction processing in accordance with the result of such testing. If the value of second primary color component is greater than the value of the third primary color component, then the value of the second primary color component is modified such that the new value is a function of the value of the first primary color component and the value of the second primary color component. The function is any suitable function known in the art for adjusting color component values. The function is suitably a calculated function for adjusting the value or a function value retrieved from a memory means, such as a look up table. Preferably, the function is chosen such that a magnitude of the color correction signal is dictated by a proximity of value of a designated one of the primary colors relative to values of primary colors adjacent thereto. In a preferred embodiment, the value of the second primary color component is modified such that the new value equals the current value of the second primary color component plus a function of the value of the first primary color component and the value of the second primary color component. Flow then proceeds to 412, wherein the color image data is generated in accordance with the color correction process.

In one embodiment, if the value of the green component is determined to be greater than the value of the red component, the color correction process is in accordance with such result. The value of the green component is modified as a function of the value of the blue component and the green component. Preferably, the value of the green component is modified such that the new value equals the current value of the green component plus a function of the value of the blue component and the value of the green component. It is understood that if the value of the green component is tested in step 404, rather than the value of the blue component, than the either the value of the blue component or the value of the red component are used as the second component, and the value of the second component is modified as described. Further, if the value of the red component is tested in step 404, then either the value of the blue component or the value of the green component are used as the second component, and the value of the second component is modified as described.

If the value of the second primary color is not greater than the value of the third primary color, flow proceeds to step 410 for color correction processing in accordance with the result of such testing. If the value of second primary color component is greater than the value of the third primary color component, then the value of the second primary color component is modified such that the new value is a function of the value of the first primary color component and the value of the third primary color component. The function is any suitable function known in the art for adjusting color component values. The function is suitably a calculated function for adjusting the value or a function value retrieved from a memory means, such as a look up table. Preferably, the function is chosen such that a magnitude of the color correction signal is dictated by a proximity of value of a designated one of the primary colors relative to values of primary colors adjacent thereto. In a preferred embodiment, the value of the second primary color component is modified such that the new value equals the current value of the second primary color component plus a function of the value of the first primary color component and the value of the third primary color component. Flow then proceeds to 412, wherein the color image data is generated in accordance with the color correction process.

In one embodiment, if the value of the green component is determined not to be greater than the value of the red component, the color correction process is in accordance with such result. The value of the green component is modified as a function of the value of the blue component and the red component. Preferably, the value of the green component is modified such that the new value equals the current value of the magenta component plus a function of the value of the blue component and the value of the red component. It is understood that if the value of the green component is tested in step 404, rather than the value of the blue component, than the either the value of the blue component or the value of the red component are used as the second component, and the value of the second component is modified as described. Further, if the value of the red component is tested in step 404, then either the value of the blue component or the value of the green component are used as the second component, and the value of the second component is modified as described.

While in the preferred embodiment the present invention is implemented in software, as those skilled in the art can readily appreciate it may also be implemented in hardware or a combination of software and hardware.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed:

1. A system for color correction comprising:
   means adapted for receiving image data inclusive of a first color signal, which first color signal includes primary color data inclusive of data associated with of each of plurality of primary colors encoded in component values defined within a color space inclusive of cyan, magenta, and yellow values;
   means adapted for receiving a at least one component threshold value corresponding to a color space conversion;
   means adapted for testing of a first component value of received image data against at least one received component threshold value to determine whether the first component value is less than the at least one threshold value;
   means adapted for terminating a color correction if the value of the first component value of received image data is not equal or less than the at least one threshold value;
   means adapted for determining which of a second component value of received image data and a third component value of received image data is a lesser value;
   means adapted for generating a selection value in accordance with a determination as to which one of the second component value and the third component value are of lesser value;
   means adapted for receiving preselected color adjustment data defining a preselected component reduction level;
   means adapted for generating, in accordance with the color adjustment data, a color correction signal as a function of the one of the second component value and the third component value identified by the selection value, and the first component value; and
   means adapted for generating corrected image data in accordance with a generated color correction signal.

2. The system for color correction of claim 1 wherein the function is chosen such that a magnitude of the color correction signal is dictated by a proximity of value of a designated one of the primary colors relative to values of primary colors adjacent thereto.

3. The system for color correction of claim 1 further comprising means adapted for determining whether the first component value is less than the second component value and the third component value.

4. The system for color correction of claim 1 wherein if the means adapted for determining which of the second component value and the third component value is the lesser value determines that the second component value is the lesser value, corrected image data is generated as a modification of the second component value as function of the first component value and the second component value.

5. The system for color correction of claim 4 wherein the modification of the second component value is modified such that the new value equals the current value of the second component less a function of the first component value and the second component value.

6. The system for color correction of claim 1 wherein if the means adapted for determining which of the second component value and the third component value is the lesser value determines that the third component value is the lesser value, the corrected image data is generated as a modification of the second component value as function of the first component value and the third component value.

7. The system for color correction of claim 6, wherein the modification of the second component value is modified such that the new value equals the current value of the second component less a function of the first component value and the third component value.

8. A system for color correction comprising:
   means adapted for receiving image data inclusive of a first color signal, which first color signal includes primary color data inclusive of data associated with of each of plurality of primary colors encoded in component values defined within a color space inclusive of red, green, and blue values;
   means adapted for receiving at least one component threshold value;
   means adapted for testing of a first component value of received image data against at least one received component threshold value to determine whether the first component value is greater than the at least one threshold value;
   means adapted for terminating a color correction if the first component value of received image data is not equal to or greater than the at least one threshold value;
   means adapted for determining which of a second component value of received image data and a third component value of received image data is a greater value;
   means adapted for generating a selection value in accordance with a determination as to which of the one of the second component value and the third component value are of greater value;
   means adapted for receiving preselected color adjustment data defining a preselected component addition level;
   means adapted for generating, in accordance with color adjustment data, a color correction signal as a function of the one of the second component value and the third component value identified by the selection value, and the first component value; and
   means adapted for generating corrected image data in accordance with a generated color correction signal.

9. The system for color correction of claim 8 wherein the function is chosen such that a magnitude of the color correction signal is dictated by a proximity of value of a designated one of the primary colors relative to values of primary colors adjacent thereto.

10. The system for color correction of claim 8 further comprising means adapted for determining whether the first component value is greater than the second component value and the third component value.

11. The system for color correction of claim 8 wherein if the means adapted for determining which of the second component value and the third component value is the greater value determines that the second component value is the greater value, corrected image data is generated as a modification of the second component value as function of the first component value and the second component value.

12. The system for color correction of claim 11 wherein the modification of the second component value is modified such that the new value equals the current value of the second component plus a function of the first component value and the second component value.

13. The system for color correction of claim 8 wherein if the means adapted for determining which of the second component value and the third component value is the greater value determines that the third component value is the greater value, the corrected image data is generated as a modification of the second component value as function of the first component value and the third component value.

14. The system for color correction of claim 13, wherein the modification of the second component value is modified such that the new value equals the current value of the second component plus a function of the first component value and the third component value.

15. A method for color correction comprising the steps of:
receiving image data inclusive of a first color signal, which first color signal includes primary color data inclusive of data associated with of each of plurality of primary colors encoded in component values defined within a color space inclusive of cyan, magenta, and yellow values;
receiving at least one component threshold value;
testing of a first component value of received image data against at least one received component threshold value to determine whether the first component value is less than the at least one threshold value;
terminating a color correction if the first component value of received image data is not equal to or less than the at least one threshold value;
determining which of a second component value of received image data and a third component value of received image data is a lesser value;
generating a selection value in accordance with a determination as to which one of the second component value and the third component value which are of lesser value;
receiving preselected color adjustment data defining a preselected component reduction level;
generating, in accordance with the color adjustment data, a color correction signal as a function of the one of the second component value and the third component value identified by the selection value, and the first component value; and
generating corrected image data in accordance with a generated color correction signal.

16. The method for color correction of claim 15 wherein the function is chosen such that a magnitude of the color correction signal is dictated by a proximity of value of a designated one of the primary colors relative to values of primary colors adjacent thereto.

17. The method for color correction of claim 15 further comprising the step of determining whether the first component value is less than the second component value and the third component value.

18. The method for color correction of claim 15 wherein if the step of determining which of the second component value and the third component value is the lesser value determines that the second component value is the lesser value, corrected image data is generated as a modification of the second component value as function of the first component value and the second component value.

19. The method for color correction of claim 18 wherein the modification of the second component value is modified such that the new value equals the current value of the second component less a function of the first component value and the second component value.

20. The method for color correction of claim 19 wherein if the step of determining which of the second component value and the third component value is the lesser value determines that the third component value is the lesser value, the corrected image data is generated as a modification of the second component value as function of the first component value and the third component value.

21. The method for color correction of claim 20, wherein the modification of the second component value is modified such that the new value equals the current value of the second component less a function of the first component value and the third component value.

22. A method for color correction comprising the steps of:
receiving image data inclusive of a first color signal, which first color signal includes primary color data inclusive of data associated with of each of plurality of primary colors encoded in component values defined within a color space inclusive of red, green, and blue values;
receiving at least one component threshold value;
testing of a first component value of received image data against at least one received component threshold value to determine whether the first component value is greater than the threshold value;
terminating a color correction if the first component value of received image data is not equal to or greater than the at least one threshold value;
determining which of a second component value of received image data and a third component value of received image data is a greater value;
generating a selection value in accordance with a determination as to which one of the second component value and the third component value are of greater value;
receiving preselected color adjustment data defining a preselected component addition level;
generating, in accordance with the color adjustment data, a color correction signal as a function of the one of the second component value and the third component value identified by the selection value, and the first component value; and
generating corrected image data in accordance with a generated color correction signal.

23. The method for color correction of claim 22 wherein the function is chosen such that a magnitude of the color correction signal is dictated by a proximity of value of a designated one of the primary colors relative to values of primary colors adjacent thereto.

24. The method for color correction of claim 22 further comprising the step of determining whether the first component value is greater than the second component value and the third component value.

25. The method for color correction of claim 22 wherein if the step of determining which of the second component value and the third component value is the greater value determines that the second component value is the greater value, corrected image data is generated as a modification of the second component value as function of the first component value and the second component value.

26. The method for color correction of claim 25 wherein the modification of the second component value is modified such that the new value equals the current value of the second component plus a function of the first component value and the second component value.

27. The method for color correction of claim 22 wherein if the step of determining which of the second component value and the third component value is the greater value determines that the third component value is the greater value, the corrected image data is generated as a modification of the second component value as function of the first component value and the third component value.

28. The method for color correction of claim 27 wherein the modification of the second component value is modified such that the new value equals the current value of the second component plus a function of the first component value and the third component value.

* * * * *